United States Patent [19]

Kruger et al.

[11] 4,035,100
[45] July 12, 1977

[54] DRILLING TOOL WITH A DRILLING MEMBER AND A TOOL HOLDER INPUT UNIT

[75] Inventors: Wilm Krüger, Puchheim; Gerhard Rumpp, Inning; Dieter Scholz, Unterpfaffenhofen, all of Germany

[73] Assignee: Dibotec Aktiengesellschaft, Zurich, Switzerland

[21] Appl. No.: 662,232

[22] Filed: Feb. 27, 1976

[30] Foreign Application Priority Data

Mar. 3, 1975 Germany .................. 2509140

[51] Int. Cl.² ................................. B23B 51/02
[52] U.S. Cl. ............... 408/226; 279/1 A; 279/1 SG; 279/102; 408/230
[58] Field of Search .......... 408/226, 229, 230, 231, 408/238, 714; 279/1 A, 1 SG, 23, 102

[56] References Cited

U.S. PATENT DOCUMENTS

| 277,404 | 5/1883 | Barker | 279/102 X |
| 2,940,765 | 6/1960 | Appleby | 408/226 |
| 3,082,530 | 3/1963 | Hopf et al. | 279/23 X |
| 3,716,247 | 2/1973 | Sato | 279/1 SG |

*Primary Examiner*—Othell M. Simpson
*Assistant Examiner*—Z. R. Bilinsky
*Attorney, Agent, or Firm*—Toren, McGeady and Stanger

[57] ABSTRACT

A drilling tool for use in the tool holder of a drilling machine includes a drilling member and a holder input unit laterally enclosing the end of the drilling member which fits into the tool holder. The holder input unit is hollow and is non-rotatably connected to the drilling member. The input unit consist of an outer sleeve having a large radially outer surface spaced outwardly from the drilling member and webs extending between the drilling member and the sleeve. The outer surface of the sleeve is generally polygonal in cross section transverse to the axis of the drilling member and is shaped to fit into and contact the tool holder. The webs and sleeve of the holder input unit effect the transmission of heat from the drilling member.

13 Claims, 4 Drawing Figures

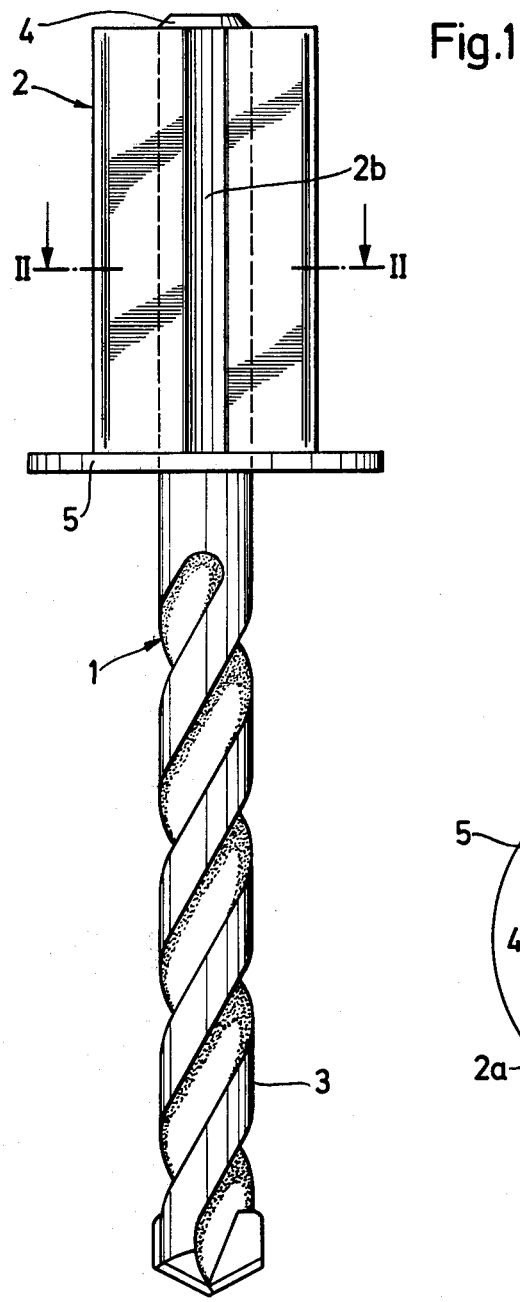
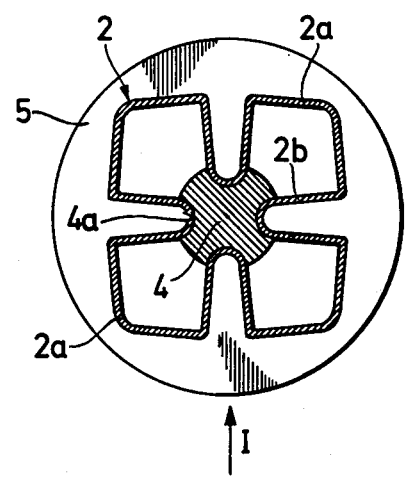
Fig.1
Fig.2

DRILLING TOOL WITH A DRILLING MEMBER AND A TOOL HOLDER INPUT UNIT

SUMMARY OF THE INVENTION

The present invention is directed to a drilling tool formed of a drilling member and a holder input unit which laterally supports a portion of the drilling member and includes a shell spaced radially outwardly from the drilling member and non-rotatably connected to it. The input unit has a large outer surface which fits into and contacts the tool holder of a drilling machine.

In drilling tools, the drilling member and its end which fits into the tool holder of a drilling machine are generally formed integrally and are made of the same material. While the holder end has substantially constant dimensions for each type of drilling machine, that is, it is adapted to fit into the tool holder of the drilling machine in which the drilling tool is used, however, the diameter of the drilling member can vary depending on its application. There can be considerable differences between the diameter of the drilling member and its holder end or input unit.

In particular, there are considerable diameter differences between the holder end and the drilling member of small drills with the holder end having a relatively large diameter compared to the drilling member. As a result, even drilling tools with small diameter drilling members have holder ends or input units of considerable mass.

If such drilling tools are used in a drilling machine, the weight of the drilling end of the machine is considerably increased. In addition, because of the large masses of such drilling tools, which must be accelerated during drilling, shock losses are experienced which lead to a loss of power. Since a considerable portion of the mass of the holder end is radially outwardly from the diameter range of the drilling member where the drilling member has a small diameter, the out-of-true run of the drilling tools can be increased which results in premature wear and under certain circumstances even in destruction of the drilling tool.

The manufacture of integral drilling tools formed of the same material is extremely uneconomical. Accordingly, for example, it is possible to upset the diameter of the drilling member corresponding to the starting material to such an extent that the holder end can be attached, or to rework the starting material corresponding to the diameter of the working member by removal of material or by mechanically working to the diameter of the drilling member. Furthermore, starting material with a mean diameter can be used and worked mechanically to the desired dimensions by a combination of the above-mentioned methods. However, since large amounts of material must be reworked, these manufacturing methods are uneconomical.

Efforts have been made to eliminate these disadvantages, however, such elimination has been possible only at the expense of other disadvantages.

It is known, for example, to produce the drilling member and its holder end from two parts and then subsequently to join them together. It has been tried to form the holder end or input unit of plastic. Such tools are more economical to manufacture, but they have other disadvantages in use which are decisive in their effects.

When a drilling tool is used, as is known, considerable heat is generated by friction within the borehole. Further, when hammer drills are used, the drilling tool is heated additionally at its rear end by the blows directed against the drilling tool. While the elimination of heat accumulating in the holder ends of drilling tools within the tool holder of a drilling machine presents no problem in integrally formed tools, the elimination of heat in a plastic input unit provides problems. The plastic input unit undergoes undesired deformations with the result that the transmission of torque from the input unit to the shank of the drilling member and the centering of the shank within the input unit cannot be ensured. Another known drilling tool has used a holder end or input unit formed of rubber which, in turn, is surrounded by a reinforcing sleeve of steel and such a drilling tool is also incapable of eliminating the problem of heat transmission. This particular solution to the problem is again very uneconomical, because three different parts must be adapted to one another and assembled into a drilling tool. Therefore, the present invention is directed to the problem of providing a drilling tool which ensures, on one hand, that the disadvantages experienced in the past are overcome and, on the other hand, affords an economically advantageous method of producing the drilling tool.

In accordance with the present invention, the problem is solved by forming the holder end of the drilling tool as a hollow section with webs which extend between the shank of the drilling member and the large area surfaces of a shell which forms the radially outer portion of the holder end and fits within and contacts the tool holder of a drilling machine.

The drilling tool according to the present invention consists of a drilling member and holder end or input unit which includes a shell spaced radially outwardly from the shank of the drilling member with webs extending between the shank and the shell. The shell of the input unit has a large area outer surface and it fits within and contacts the tool holder of a drilling machine for receiving the torque to be transmitted to the drilling member. The webs disposed between the shell and the shank serve to secure the shell in a non-rotatable manner on the drilling member.

The input unit, preferably formed as a hollow section consisting of an outer shell and webs, can be constructed as a single part or multi-part sheet metal body. Such an input unit can be economically produced and permits any desired shape for the outer contour of the shell, that is, the outer circumferential peripheral shape of the shell can be constructed as a polygon of any desired form. Moreover, the input unit formed in accordance with the present invention permits a considerable reduction in weight of the overall drilling tool and ensures an optimum elimination of the heat generated in the drilling member.

To optimize the elimination of the heat generated in the drilling member, the webs of the input unit are formed integrally with the large area surfaces of the shell in accordance with one feature of the invention. There are considerable advantages in the production of such input units since they can be formed by extrusion which permits the formation of a large number of the units.

If the input unit is formed as a multi-part steel sheet body it can preferably have a sleeve-type shell which is combined with the webs into a non-rotating unit. The outer circumferential peripheral configuration of the sleeve type shell can be made complementary to the inner contour of the tool holder in the drilling machine.

In effecting the non-rotating connection between the input unit and the drilling member, the webs of the input unit can be preferably engaged within recesses provided in the shank of the drilling member. Such a connection substantially prevents rotation between the drilling member and the input unit and also provides the possibility for the combination with other means which serve to lock the input unit in the axial direction on the shank of the drilling member.

Another feature of the invention is the provision of the webs of the input unit formed integrally with a sleeve which laterally embraces the shank of the drilling member. The sleeve affords excellent transmission of the heat from the shank to the webs due to its large surfaces which laterally contact the shank. The sleeve can be fastened on the shank in various ways, for example, by form-locking, welding, cementing and other means.

To ensure the uniform transmission of torque from the shell of the input unit to the shank of the drilling member, the webs of the input unit extend for its full axial dimension. Such a dimensioning of the webs provides a reinforcement for the shell of the input unit affording additional large cross sectional surfaces for the elimination of heat so that the wall thicknesses of the input unit can be kept small which affords a further saving in weight.

To compensate for certain tolerances in the outer configuration of the input unit it can be subdivided into a number of axially extending segments spaced apart in the circumferential direction of the unit. Such a subdivision of the shell is preferably effected by providing axially extending slots located between adjacent webs. In such a construction, each shell segment is carried by at least one web whereby the reinforcement of the shell as well as the thermal conductivity of the shell and the shank drilling member are not disturbed.

It is preferred if the cavities formed within the hollow input unit, that is, between the shell, the webs and the shank of the drilling member, contain no fillers so that the thermal radiation of the arrangement is not impaired. In addition to the thermal conductivity provided by the webs, the hollow shape of the input unit affords an additional possibility for improving the elimination of the heat generated in the drilling member. Further, in accordance with the present invention, it is possible to shield the entire tool holder end of the drilling tool within the drilling machine. Thus, a disk-shaped cover can be positioned on the drilling tool at its end where it extends into the input unit. Such a cover can be secured axially and radially in the open spaces of the input unit in a simple manner, for example, by means of projections or depressions.

Preferably, the drilling tool has means for holding the input unit which are located on its shank. Accordingly, it is possible to lock the input unit in both the axial and radial directions on the drilling tool.

The means for securing the input unit on the drilling tool are preferably designed as recesses into which the webs of the input unit can be secured. The recesses are provided in the surface of the shank of the drilling member so that it has a transverse cross sectional configuration deviating from a circular cross sectional shape. With such a recessed surface on the drilling member it is possible to exchange the drilling member and such a feature is of considerable benefit since the drilling member is subject to wear.

An effective connection between the input unit and the shank of the drilling member is obtained by forming the recesses as longitudinally or axially extending grooves. It has been found to be expedient to use four longitudinally extending grooves equiangularly spaced about the shank. However, it is also possible to use a drilling member having a shank which is elliptical or polygonal in cross section for effecting its entrainment within the input unit.

To prevent axial displacement of the input unit on the shank of the drilling member or undesired accidental removal of the input unit from the drilling member, the longitudinally extending grooves are provided only over that portion of the shank of the drilling member on which the input unit is mounted. In such an arrangement, the axial dimension of the webs of the input unit are formed in accordance with the axial length of the grooves in the shank.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is an elevational view of a drilling tool embodying the present invention;

FIG. 2 is a cross sectional view of the drilling tool of FIG. 1 taken along the line II—II;

DETAILED DESCRIPTION OF THE INVENTION

Figure 3:
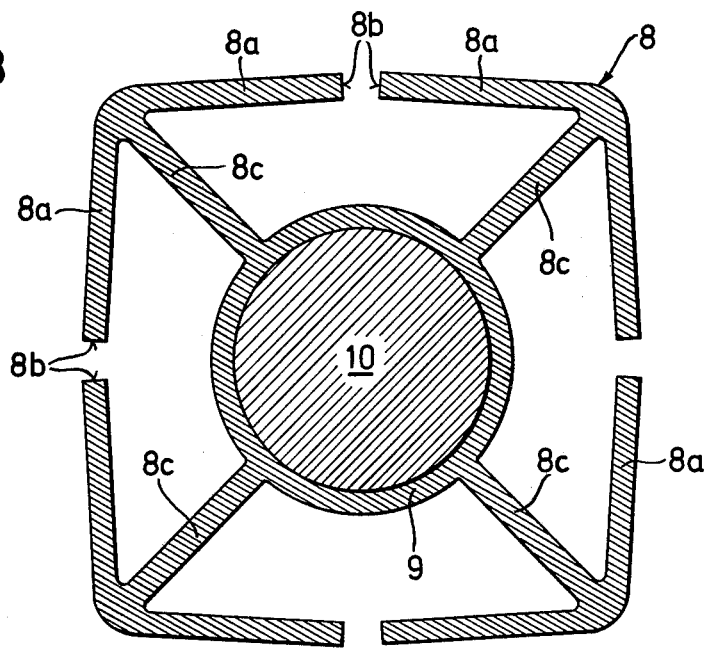
FIG. 3 is an enlarged cross sectional view, as compared to FIG. 2, illustrating another embodiment of a drilling tool in accordance with the present invention.

In FIG. 1 a drilling tool is illustrated consisting of a drilling member 1 and an input unit 2 mounted on one end of the drilling member. The drilling member consists of an axially extending shank having a spirally-shaped drilling surface 3 at one end and a shank 4 axially extending from the drilling surface at the other end. The shank 4 extends through the axial length of the input unit 2 and extends slightly from its end face spaced from the drilling surface. As can be noted in FIG. 1, the shank 4 also extends forwardly from the input unit to the spirally-shaped drilling surface 3.

At the forward end of the input unit 2, that is, the end closer to the drilling surface 3, the drilling tool includes a cover 5 which acts as a shield for the tool holder of a drilling rig into which the drilling tool can be inserted. The cover keeps dust and other materials from entering the tool holder. The cover 5 can be secured in a simple manner such as by frictional contact with the shank 4 or the cover can be provided with separate fins or cams which engage within or overlap the input unit 2.

As is illustrated in FIG. 2, the input unit is a hollow section having an outer shell 2a with a polygonal configuration. Webs 2b are formed from the shell 2a and extend radially inwardly into engagement within groove-type recesses 4a in the shank 4 of the drilling member. The engagement of the webs within the recesses affords a non-rotating connection between the drilling member 1 and the input unit 2. Cavities or open spaces are provided between the shank 4, the webs 2b and the shell 2a which afford thermal radiation. Another embodiment of the drilling tool is shown in FIG. 3 in which the input unit 8 is formed with a shell 8a having longitudinally or axially extending slots 8b so that the outer surface of the input unit, similar to the embodiment shown in FIGS. 1 and 2, is subdivided into individual segments. In this embodiment, the shank 10 of the drilling tool is laterally enclosed by a sleeve 9 which is non-rotatably attached to the shank. Extending radially outwardly from the sleeve 9 to the shell 8a are webs 8c which connect the shell 8a in a non-rotatable manner with the shank 10 of the drilling tool.

Figure 4:
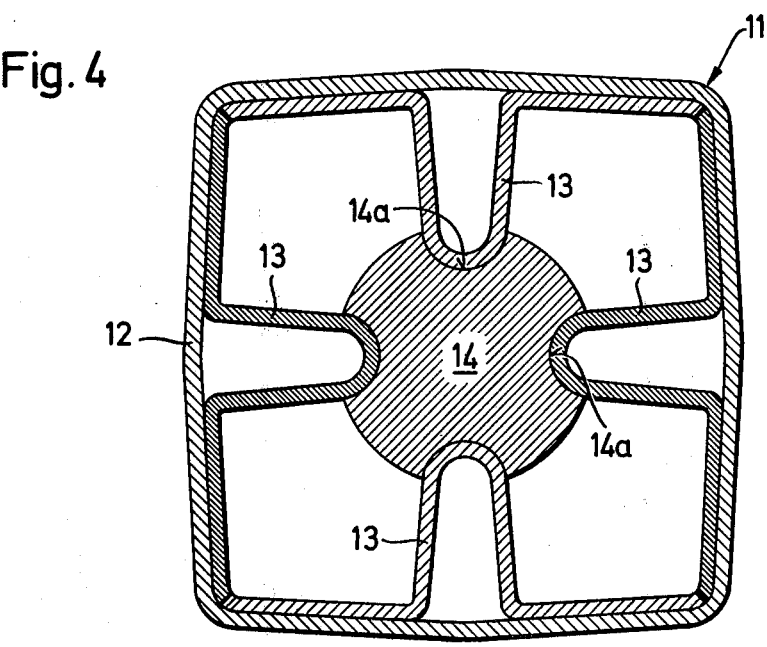
FIG. 4 is still another cross sectional view similar to FIG. 3 of a drilling tool embodying the present invention and formed of a multi-part input unit.

In FIG. 4 another embodiment of an input unit 11 is illustrated and the unit consists of a multi-part sheet metal body. The outer portion of the unit is provided by a sleeve-type shell 12 which encloses four webs 13, note the joints between adjacent webs located at the inside corners of the shell 12. The webs have radially inwardly extending portions which engage within groove-type recesses 14a in the shank 14 of the drilling member. Instead of the illustrated connection between the shank 14 and the webs 13, it is also possible to provide the connection by the use of webs and a sleeve similar to the arrangement shown in FIG. 3.

In the drawing, the various embodiments of the invention are shown having a generally square shape, however, these are merely illustrative and are not meant to limit the shape provided for the circumferential peripheral surface of the input unit. It can be readily appreciated that the outer surfaces of the input units can be provided with any desirable contour which is complementary to the tool holder of the drilling machine into which the drilling tool is inserted.

While specific embodiments of the invention have been shown and described in detail to illustrate the application of the inventive principles, it will be understood that the invention may be embodied otherwise without departing from such principles.

We claim:

1. Drilling tool for use in the tool holder of a drilling machine comprising a drilling member including an axially elongated shank and an input unit including a shell laterally enclosing said shank and arranged to fit within the tool holder of the drilling machine, said shell being spaced radially outwardly from and non-rotatably connected to said shank, said shell having a large outer circumferential peripheral surface, wherein the improvement comprises that said input unit is hollow, said input unit includes webs axially co-extensive with said shell and said webs extending radially relative to said shank between said shank and said shell, and the outer circumferential peripheral surface of said shell is arranged to fit within the tool holder of the drilling machine.

2. Drilling tool, as set forth in claim 1, wherein said webs are integral with the circumferential peripheral surfaces of said shell.

3. Drilling tool, as set forth in claim 1, wherein said webs are laterally enclosed within a sleeve-type shell.

4. Drilling tool, as set forth in claim 1, wherein said shank of said drilling member has recesses formed therein with said webs engaged within the recesses.

5. Drilling tool, as set forth in claim 1, wherein said input unit includes a sleeve laterally enclosing and secured to said shank and said webs being formed integrally with and extending outwardly from said sleeve.

6. Drilling tool, as set forth in claim 1, wherein said input unit extends for a portion of the axial length of said drilling tool and said webs extend for the axial length of said input unit.

7. Drilling tool, as set forth in claim 1, wherein said input unit extends in the axial direction of said drilling tool and the shell of said input unit has axially extending slots therein.

8. Drilling tool, as set forth in claim 1, wherein said input unit extends in the axial direction of said drilling tool, said shell of said input unit is divided into axially extending segments and at least one of said webs is connected to each said segment.

9. Drilling tool, as set forth in claim 1, wherein said hollow input unit extends in the axial direction of said drilling member and said webs and shell in combination with said shank define the boundaries of hollow cavities which effect the transmission of heat by thermal radiation from the shank of said drilling member to said shell.

10. Drilling tool, as set forth in claim 1, wherein said drilling tool extends axially outwardly from said input unit and has a drilling surface thereon and a disk-shaped cover extending transversely of the axial direction of said drilling member and positioned against the end of said input unit from which the drilling surface of said drilling member extends.

11. Drilling tool, as set forth in claim 1, wherein means are located on said shank for securing said input unit to said shank of said drilling member.

12. Drilling tool, as set forth in claim 11, wherein said means comprises recesses formed in the shank of said drilling member for engaging the webs of said input unit.

13. Drilling tool, as set forth in claim 12, wherein the recesses formed in said shank of said drilling member extend in the axial direction of said shank.

* * * * *